J. C. BARBER.
CENTER BEARING FOR CARS.
APPLICATION FILED APR. 2, 1909.

937,038.

Patented Oct. 19, 1909.
2 SHEETS—SHEET 1.

Witnesses:
L. L. Simpson
A. H. Opsahl

Inventor:
John C. Barber
By his Attorneys:
Williamson & Merchant

J. C. BARBER.
CENTER BEARING FOR CARS.
APPLICATION FILED APR. 2, 1909.

937,038.

Patented Oct. 19, 1909.
2 SHEETS—SHEET 2.

Witnesses:
L. L. Simpson
A. H. Opsahl

Inventor:
John C. Barber
By his Attorneys:
Williamson & Merchant

UNITED STATES PATENT OFFICE.

JOHN C. BARBER, OF CHICAGO, ILLINOIS.

CENTER-BEARING FOR CARS.

937,038. Specification of Letters Patent. Patented Oct. 19, 1909.

Application filed April 2, 1909. Serial No. 487,493.

*To all whom it may concern:*

Be it known that I, JOHN C. BARBER, a citizen of the United States, residing at Chicago, in the county of Cook and State of Illinois, have invented certain new and useful Improvements in Center-Bearings for Cars; and I do hereby declare the following to be a full, clear, and exact description of the invention, such as will enable others skilled in the art to which it appertains to make and use the same.

My invention has for its object to provide an improved roller bearing center plate for cars, and to this end it consists of the novel devices and combinations of devices hereinafter described and defined in the claim.

In the accompanying drawings which illustrate the invention, like characters indicate like parts throughout the several views.

Figure 1:
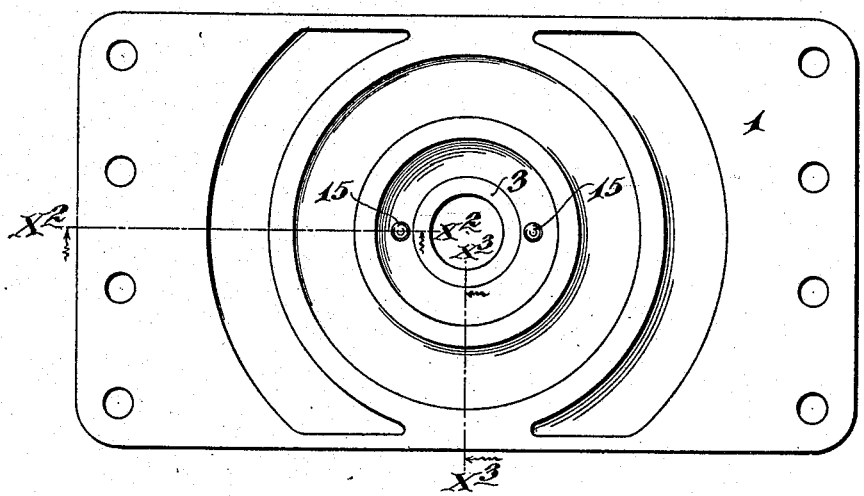
Figure 2:
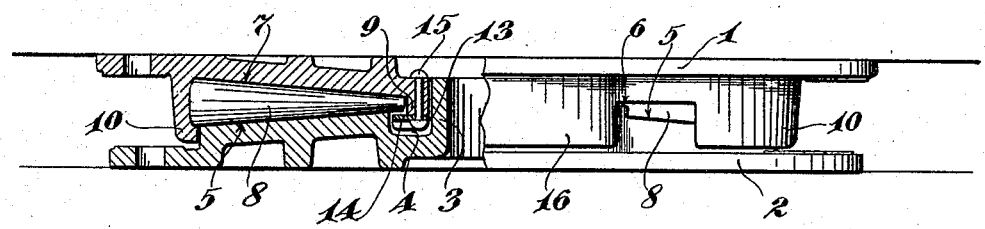
Figure 3:
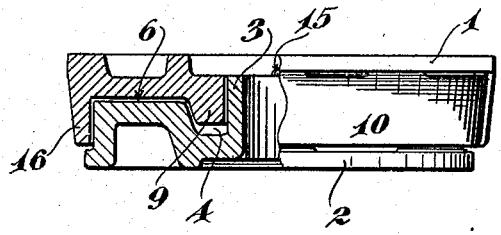
Figure 4:
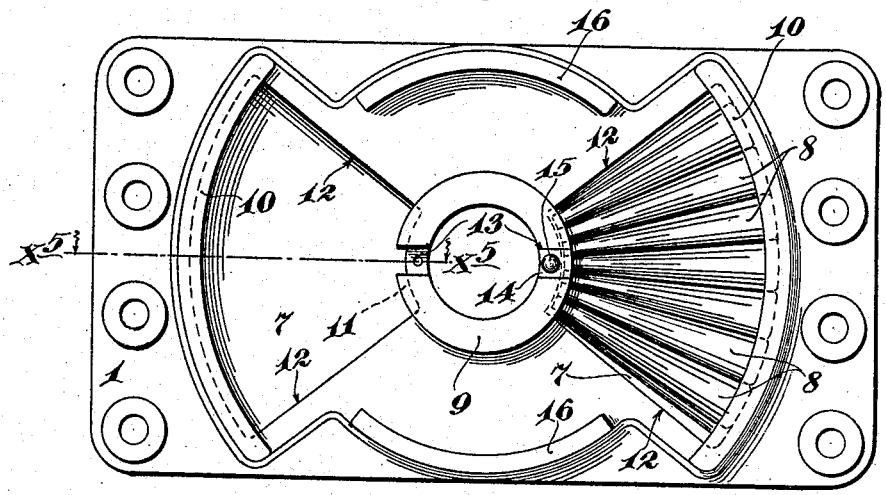
Figure 5:
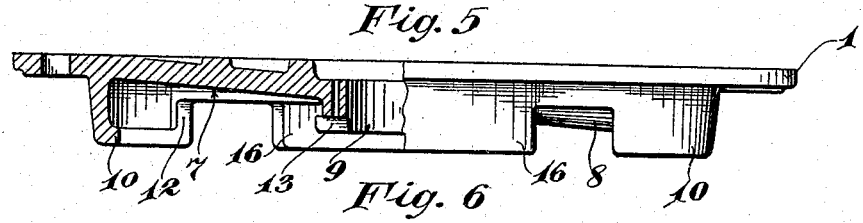
Figure 6:
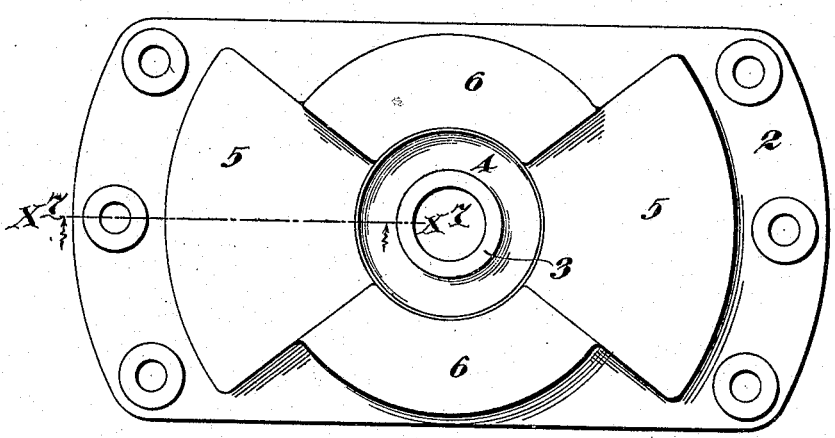
Figure 7:
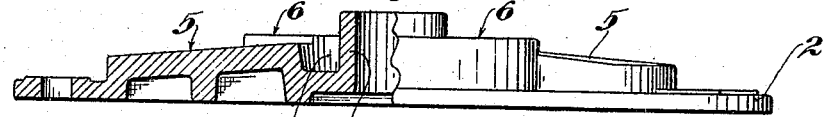

Referring to the drawings: Figure 1 is a plan view of the improved center bearing; Fig. 2 is a view partly in elevation, and partly in section on the line $x^2$ $x^2$ of Fig. 1; Fig. 3 is a view partly in elevation, and partly in section on the line $x^3$ $x^3$ of Fig. 1; Fig. 4 is a bottom plan view of the upper plate of the center bearing, showing the rollers applied thereto on one side only, other parts being removed; Fig. 5 shows the parts shown in Fig. 4, partly in elevation and partly in section on the line $x^5$ $x^5$ of said Fig. 4; Fig. 6 is a plan view of the lower bearing plate of the center bearing; and Fig. 7 is a view partly in elevation, and partly in section on the line $x^7$ $x^7$ of Fig. 6.

The numerals 1 and 2 indicate respectively, the upper and lower members or bearing plates of the center bearing. The upper bearing plate or member 1 is adapted to be bolted or otherwise rigidly secured to the main coöperating body or car bolster, not shown, and the lower bearing plate or member 2, likewise is adapted to be bolted or otherwise rigidly secured to the coöperating truck bolster, not shown. These bearing plates are in width, preferably, approximately the same as the bolsters to which they are applied, but they are elongated in a direction longitudinally of the said bolster and transversely of the car; and in this improved center bearing, the rollers interposed between the bearing plates, are made very much longer than is customary, and are assembled in two groups, one group being located on each side of the center bearing and of the center of the car. By this arrangement, the roller bearing support for the car is very greatly widened out or extended, and at the same time, the entire center bearing is kept within the space between the coöperating truck and body bolsters. Furthermore, in a direction from front to the rear of the axis of the center bearings, clearance space is left for the provision of very strong and efficient thrust or shearing surfaces between the two bearing plates, such as are required to withstand intense shocks produced in heavy car equipment in a direction longitudinally of the car.

To the above ends, the lower bearing plate 2 is formed, at its center, with an upwardly projecting axial hub or sleeve 3, that is surrounded by an annular channel 4. At points on opposite sides of the channel 4, and raised above the same, said bearing plate 2 is provided with segmental roller bearing surfaces 5, and between these, with raised segmental thrust flanges 6. The bearing surfaces 5 are preferably slightly lower than the upper surfaces of the thrust flanges 6, and they extend through, less than 90 degrees, while the said thrust flanges 6 extend through somewhat more than 90 degrees.

The upper bearing plate 1 is formed with segmental bearing surfaces 7 that overlie the bearing surfaces 5, and are approximately co-extensive therewith. Long conical bearing rollers 8 are interposed between the coöperating bearing surfaces 5 and 7, and these coöperating bearing surfaces are conical and flare from each other outwardly.

The upper bearing plate 1 is provided with a depending annular hub 9, that is telescoped around the hub 3 of the lower plate 2, and works partly within the annular channel 4. The outer extremities of the segmental roller bearing surfaces 7 of the upper plate 1, are provided with depending segmental roller retaining flanges 10, that are grooved on their inner faces to receive and hold the large outer ends of the coöperating rollers, while permitting the said rollers to travel as required when the car travels a curve. The hub 9 is also provided with segmental roller retaining grooves 11 that likewise receive the inner ends of the rollers, but permit required traveling movements thereof. The segmental retaining grooves in the flanges 10 and in the hub 9, coöperate with the shoulders 12 at the extremities of the bearing surfaces 7, to form cages that receive and hold the bearing rollers with freedom for required traveling movements, when the two bearing plates 1 and 2 are moved pivotally one in respect to the other. The required traveling movements of the bearing rollers is, as is well known, very slight. To permit of the application of the rollers within these cages, the hub 9 is formed with two entrance notches 13, one for each set of rollers, which notches are of such width to permit one roller at a time to be inserted into working position. When the rollers have been inserted, the entrance notches 13 are closed by small clips or blocks 14, secured in position by rivets or bolts 15. Between the segmental bearing surfaces 7, the upper bearing plate 1 is provided with depending segmental thrust flanges 16 that engage with the outer surfaces of the segmental thrust flanges 6 of the lower bearing plate 2. These segmental thrust flanges 16 are enough shorter than the space between the roller bearing surfaces 5, to permit the required pivotal movement of the bearing plates 1 and 2 in respect to each other.

As already indicated, this improved center bearing affords a roller bearing support which is very wide in a direction transversely of the car, and which therefore affords a highly efficient lateral support for the car body. This is important, especially in heavy car construction. The roller bearings are given such increased length over those customarily employed, that the maximum supporting surface afforded thereby, is greater than that afforded by the complete series of bearing rollers of a diameter contained within the width of a car or truck bolster of standard construction. Furthermore, this important bearing is adapted for application to car bolsters and truck bolsters of the standard construction and customary width.

In a direction longitudinally of the car, which is a direction transversely of the bearing plates 1 and 2, the thrusts or shearing strains on the center bearing members are resisted in the following places, to-wit: between the telescoped hubs 3 and 9; between said hub 9 and the shoulders at the inner surfaces of the thrust flanges 6; and between the outer surfaces of said thrust flanges 6 and the coöperating thrust flanges 16.

In a direction transversely of the car or longitudinally of the bearing plates 1 and 2, thrust or shearing strains are resisted in the following places, to-wit: between the telescoped hubs 3 and 9; between said hub 9 and shoulders at the inner extremities of the segmental bearing surfaces 5; and between shoulders at the outer extremities of the said bearing surfaces 5 and the lower extremities of the roller retaining flanges 10.

By reference to Fig. 3, it will be noted, that normally there is slight clearance between the upper surfaces of the thrust flanges 6 and the flat overlying surfaces of the upper bearing plate. Hence, under all normal actions, the weight of the car will be supported entirely through the rollers, but if under exceedingly hard shocks or strains longitudinally of the car, the roller bearing plates should be tilted slightly in respect to each other, these coöperating surfaces will be thrown into engagement and resist further tilting movements thereof. This important roller bearing is therefore highly efficient both in its ability to properly support the car body, and in its ability to withstand longitudinal and other thrust or shearing strains incident to the service.

What I claim is:

In a center bearing for cars, the combination with upper and lower bearing plates having telescoped hubs and provided with segmental roller bearing surfaces on opposite sides of said hubs, of conical rollers interposed between the segmental bearing surfaces of said upper and lower bearing plates, said lower bearing plate having upwardly projecting segmental thrust flanges located concentric to, but spaced apart from its hub and extending between its segmental roller bearing surfaces and said upper bearing plate, having grooves in its hub that receive and hold the inner ends of said rollers, and having depending grooved segmental retaining flanges that receive and hold the outer ends of said rollers, the hub of said upper plate having normally closed entrance channels for the inner ends of said rollers, and the said upper plate further being provided with depending segmental thrust flanges located between the segmental bearing surface thereof, and engageable with the outer surfaces of the coöperating segmental thrust flanges of said lower bearing plate.

In testimony whereof I affix my signature in presence of two witnesses.

JOHN C. BARBER.

Witnesses:
 LEE W. BARBER,
 A. M. LOVE.